A. DAWES,

Assignor, by mesne assignments, to THE LACING STUD CO.

Lacing-Stud for Boots and Shoes.

No. 8,992. Reissued Dec. 9, 1879.

*Witnesses:*

C. H. Dodd

W. E. Lombard

*Inventor:*

Alfred Dawes by N. C. Lombard

*Attorney.*

N. PETERS, PHOTO-LITHOGRAPHER, WASHINGTON, D. C.

UNITED STATES PATENT OFFICE.

ALFRED DAWES, OF CHELSEA, MASS., ASSIGNOR, BY MESNE ASSIGNMENTS, TO THE LACING STUD COMPANY, OF NEW HAVEN, CONN.

IMPROVEMENT IN LACING-STUDS FOR BOOTS AND SHOES.

Specification forming part of Letters Patent No. 188,780, dated March 27, 1877; Reissue No. 8,992, dated December 9, 1879; application filed November 6, 1879.

*To all whom it may concern:*

Be it known that I, ALFRED DAWES, of Chelsea, in the county of Suffolk and State of Massachusetts, have invented a new and useful Improvement in Lacing Studs or Hooks for Boots and Shoes and other purposes, of which the following, taken in connection with the accompanying drawings, is a specification.

My invention relates to the manufacture of studs to be inserted in boots and shoes to receive the lacing-cord, and in other leather or cloth work for various purposes; and it consists in the use, for such purposes, of a stud having a tubular shank closed at one end, and a hook-shaped head, consisting of two circular disks, somewhat larger in diameter than, and concentric with, said tubular shank, and connected together by a neck eccentric to said disks and the tubular shank, all made from one piece of metal, and adapted to be inserted in the leather or other material by passing said tubular shank through the material and clinching the same by spreading and turning over outwardly the open end of the tubular shank in the same manner that eyelets and tubular rivets are now set.

Figure 2:
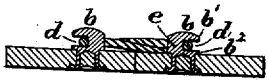
Figure 1:
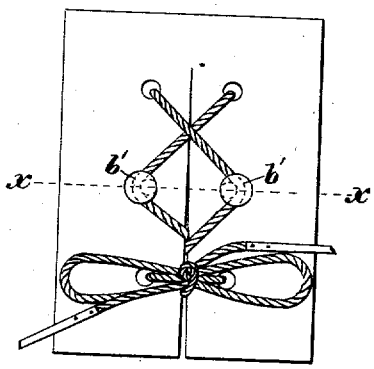
Figure 3:
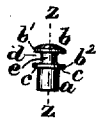
Figure 5:
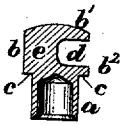
Figure 4:
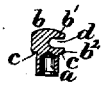

Figure 1 of the drawings is a plan of a portion of a lace-boot with two of my improved studs set therein in the proper relative position for receiving the lacing-cord to lace the slit in the boot. Fig. 2 is a transverse section of the same on line *x x* on Fig. 1. Fig. 3 is an elevation of a stud before being set. Fig. 4 is a vertical section of the same on line *z z* on Fig. 3, and Fig. 5 is a similar section enlarged.

In the manufacture of my improved stud I take wire of a diameter just equal to the desired size of the shank or body *a*, and in a rivet-making machine form therefrom rivets having elongated heads *b* and shoulder *c c*. I then turn, mill, or otherwise cut away a part of the stock of the head to form the eccentric groove *d*, thereby partially dividing said head into the two circular disks $b'$ and $b^2$, connected together at one side by the neck *e*, located eccentrically to the disks $b'$ and $b^2$ and the shank or body *a*.

The shank *a* is made tubular by drilling out its center to a point about on a line with the shoulder *c c*, the shell of the shank being made thin enough to be readily spread and turned outward in the act of securing it to a piece of leather or other material, substantially in the same manner that eyelets or tubular rivets are now set.

I am aware that lacing-studs have been made from sheet metal in the form of a hook or button, connected at one side thereof by a broad thin neck to an eyelet or two or more prongs, by which it may be secured to the leather, the whole being cut from a flat sheet of metal and stamped and bent to the desired form; but such hooks are necessarily weak in the neck, being very liable to straighten out if any considerable force is applied thereto, and the attachment to the leather is much weaker if the prongs are used, and if the eyelet is used it cannot be set as firmly as one made in the form of a tubular rivet with a closed head, for the reason that in setting, the eyelet, owing to its being unsupported by the closed head, will cripple or crack through its outer flange, and sometimes through the whole length of the tube, and, as a consequence, be imperfectly set, and may be easily detached.

Another objection to this form of lace-hook is, that on account of the way the neck is formed, and in order to give sufficient strength thereto to render it all serviceable, the neck is necessarily made wide and nearly straight along the inner side, across which the string draws, and, as a consequence, the string is soon worn by the sharp corners, so as to be unfit for use.

These objections are entirely overcome by the use of a stud cut and formed from a solid piece of metal, as described, as the neck is made round or oval in form, so as to present no sharp corners to cut the string, and the tube of the shank, being supported by the closed head of the stud, may be set very firmly in the leather.

I am also aware that a tubular-shanked stud having the neck to receive the lacing-string concentric to the head and the tubular shank made from one piece of wire has been used, and is described in Letters Patent to H. S. Walcott, April 28, 1868; but my hook-stud is an improvement upon Walcott's, in that while it retains all the advantages of strength and firm attachment to the leather possessed by Walcott's, the string is much less liable to become detached therefrom on account of the greater depth to which the string is drawn under the head by virtue of the eccentrically-located neck, and the consequent diminished tendency of the stud to cant or tip over toward the direction in which the string is drawn.

In view of the foregoing, I do not claim, broadly, a stud having a hook-shaped head or a stud having a tubular shank for securing it to the material irrespective of the form of the head; but

What I claim as new, and desire to secure by Letters Patent of the United States, is as follows:

1. A stud or hook for lacing boots and shoes and other purposes, having disks $b'$ and $b^2$, the eccentric neck $e$, made round, or nearly so, in cross-section, and a shank for securing said hook to the shoe or other material, all cut from a single piece of solid wire, substantially as and for the purposes described.

2. A stud or hook for lacing boots and shoes and other purposes, having a tubular shank or body, $a$, closed at one end, and provided with a shoulder, $c$, disks $b'$ and $b^2$, and eccentric neck $e$, all made from a single solid piece of wire, substantially as and for the purposes described.

Executed at Boston, Massachusetts, this 25th day of October, A. D. 1879.

ALFRED DAWES.

Witnesses:

N. C. LOMBARD,

C. H. DODD.